(12) United States Patent
Li et al.

(10) Patent No.: US 11,794,898 B2
(45) Date of Patent: Oct. 24, 2023

(54) AIR COMBAT MANEUVERING METHOD BASED ON PARALLEL SELF-PLAY

(71) Applicant: Northwestern Polytechnical University, Xi'an (CN)

(72) Inventors: Bo Li, Xi'an (CN); Kaifang Wan, Xi'an (CN); Xiaoguang Gao, Xi'an (CN); Zhigang Gan, Xi'an (CN); Shiyang Liang, Xi'an (CN); Kaiqiang Yue, Xi'an (CN); Zhipeng Yang, Xi'an (CN)

(73) Assignee: NORTHWESTERN POLYTECHNICAL UNIVERSITY, Xi'An (CN)

( * ) Notice: Subject to any disclaimer, the term of this patent is extended or adjusted under 35 U.S.C. 154(b) by 107 days.

(21) Appl. No.: 17/500,626

(22) Filed: Oct. 13, 2021

(65) Prior Publication Data

US 2022/0315219 A1    Oct. 6, 2022

(30) Foreign Application Priority Data

Apr. 3, 2021    (CN) .......................... 202110364109.3

(51) Int. Cl.
  *B64C 39/02*   (2023.01)
  *G05D 1/10*    (2006.01)
  *G06N 3/08*    (2023.01)
  *B64U 101/15*  (2023.01)

(52) U.S. Cl.
  CPC .......... *B64C 39/024* (2013.01); *G05D 1/104* (2013.01); *G06N 3/08* (2013.01); *B64U 2101/15* (2023.01)

(58) Field of Classification Search
  CPC ...... B64U 2101/15; G06N 3/08; G05D 1/104; B64C 39/024
  See application file for complete search history.

(56) References Cited

U.S. PATENT DOCUMENTS

| | | | |
|---|---|---|---|
| 2008/0085048 A1* | 4/2008 | Venetsky | G06V 40/28 382/114 |
| 2016/0260015 A1* | 9/2016 | Lucey | G06F 3/0481 |
| 2022/0027798 A1* | 1/2022 | Liebman | G06N 3/08 |
| 2022/0138568 A1* | 5/2022 | Smolyanskiy | G06N 3/044 706/21 |

* cited by examiner

*Primary Examiner* — Eldon T Brockman
*Assistant Examiner* — Andrew Thanh Bui
(74) *Attorney, Agent, or Firm* — Troutman Pepper Hamilton Sanders LLP (Rochester)

(57) ABSTRACT

The present disclosure provides an air combat maneuvering method based on parallel self-play, including the steps of constructing a UAV (unmanned aerial vehicle) maneuver model, constructing a red-and-blue motion situation acquiring model to describe a relative combat situation of red and blue sides, constructing state spaces and action spaces of both red and blue sides and a reward function according to a Markov process, followed by constructing a maneuvering decision-making model structure based on a soft actor-critic (SAC) algorithm, training the SAC algorithm by performing air combat confrontations to realize parallel self-play, and finally testing a trained network, displaying combat trajectories and calculating a combat success rate. The level of confrontations can be effectively enhanced and the combat success rate of the decision-making model can be increased.

7 Claims, 3 Drawing Sheets

AIR COMBAT MANEUVERING METHOD BASED ON PARALLEL SELF-PLAY

This application claims the benefit of Chinese Patent Application No. 202110364109.3, filed on Apr. 3, 2021, which is hereby incorporated by reference in its entirety.

FIELD

The present disclosure pertains to the technical field of unmanned aerial vehicles (UAVs) and particularly relates to an air combat maneuvering method.

BACKGROUND

Autonomous air combat maneuvering decision-making is a process of simulating air combat decisions of pilots in various air combat situations and automatically generating maneuvering decisions for aerial vehicles (including manned and unmanned) based on mathematical optimization, artificial intelligent algorithms and the like.

According to different methods, there may be two different types of methods, traditional and intelligent, for common maneuvering decision-making of UAVs. Traditional methods refer to the process of optimal decision-making by using expert knowledge, formula derivation, influence diagrams, etc. Such methods are more concentrated on priori knowledge or mathematical operation, and often lack a self-optimization process for decision-making. Intelligent methods refer to those methods capable of self-learning and self-optimization by using approaches such as genetic algorithms, Bayes and artificial intelligence, which are used to realize maneuver control of UAVs. Such methods can usually achieve strategy optimization according to situation targets autonomously.

However, when solving the confrontation problem of both parties, these methods have the following disadvantage: since training is performed in a single deterministic environment, policy models obtained through learning by agents would be weak in robustness for being highly adaptive to the current environment and situation. When applied to a new environment or being changed in initial situation, these policy models cannot select rational decision actions accurately. In addition, learning from scratch in a new environment would take a lot of time for training.

SUMMARY

To overcome the shortcomings of the prior art, the present disclosure provides an air combat maneuvering method based on parallel self-play, including the steps of constructing a UAV maneuver model, constructing a red-and-blue motion situation acquiring model to describe a relative combat situation of red and blue sides, constructing state spaces and action spaces of both red and blue sides and a reward function according to a Markov process, followed by constructing a maneuvering decision-making model structure based on a soft actor-critic (SAC) algorithm, training the SAC algorithm by performing air combat confrontations to realize parallel self-play, and finally testing a trained network, displaying combat trajectories and calculating a combat success rate. According to the present disclosure, the level of confrontations can be effectively enhanced and the combat success rate of the decision-making model can be increased.

The technical solution for solving the technical problems in the present disclosure includes the following steps:

step S1: constructing a UAV maneuver model;

step S2: defining our UAV as red side and enemy UAV as blue side; initializing both red and blue sides, and constructing a red-blue motion situation acquiring model to describe a relative combat situation between the red and blue sides;

step S3: constructing state spaces $S_r, S_b$ of both red and blue sides, action spaces $A_r, A_b$ of both red and blue sides and a reward function R according to a Markov process;

step S4: constructing a maneuvering decision-making model structure based on a soft actor-critic (SAC) algorithm;

step S5: initializing a plurality of groups of UAVs on both sides, defining experimental parameters, and training the SAC algorithm by allowing the plurality of groups of UAVs on both sides to perform air combat confrontations using the same maneuvering decision-making model and a same replay buffer to realize parallel self-play; and step S6: randomly initializing both sides to test a trained network, and displaying combat trajectories; randomly initializing the plurality of groups of UAVs on both sides to test the trained network, and calculating a combat success rate.

Further, the constructing a UAV maneuver model may specifically include the following steps:

supposing an OXYZ coordinate system to be a three-dimensional spatial coordinate system for UAVs, where origin O represents the center of a combat area for UAVs, with X axis pointing to the north, Z axis pointing to the east and Y axis pointing in a vertical upward direction;

regarding a UAV as a mass point and establishing equations of motion for the UAV as follows:

$$\begin{cases} X_{t+dT} = X_t + V_{t+dT} * \cos(\theta_{t+dT}) * \cos(\varphi_{t+dT}) * dT \\ Y_{t+dT} = Y_t + V_{t+dT} * \sin(\theta_{t+dT}) * dT \\ Z_{t+dT} = Z_t + V_{t+dT} * \cos(\theta_{t+dT}) ** \sin(\varphi_{t+dT}) dT \end{cases}$$

$$\begin{cases} V_{t+dT} = V_t + dv * dT \\ \theta_{t+dT} = \theta_t + d\theta * dT \\ \varphi_{t+dT} = \varphi_t + d\varphi * dT \end{cases}$$

where t denotes current time; dT denotes an integration step size of the UAV; $[X_t, Y_t, Z_t]$, $[X_{t+dT}, Y_{t+dT}, Z_{t+dT}]$ denote coordinate position components of the UAV at time t and time t+dT, respectively; $V_t, V_{t+dT}$ denote velocities of the UAV at time t and time t+dT, respectively; pitch angles $\theta_t, \theta_{t+dT}$ are included angles between velocity vectors of the UAV at time t and time t+dT, and XOZ plane; heading angles $\varphi_t, \varphi_{t+dT}$ are included angles between projection vectors of the velocity vectors of the UAV at time t and time t+dT on the XOZ plane, and the positive X axis; dv denotes an acceleration of the UAV; dθ denotes a pitch angle variation of the UAV; and dθ denotes a heading angle variation of the UAV;

Further, the step S2 may specifically include the following steps:

describing the relative situation of both sides acquired by the red-and-blue motion situation acquiring model with $\vec{D}$, d and q, where $\vec{D}$ denotes a position vector between the red side and the blue side in a direction from the red side to the blue side; d denotes a distance between the red side and the blue side; q denotes a relative azimuth angle, namely an included angle between the velocity vector $\vec{V}_r$ and the distance vector $\vec{D}$ of the red side; and denoting the combat situation of the blue side relative to the red side by $\vec{D}_r$, d and $q_r$ and the combat situation of the red side relative to the blue side by $\vec{D}_b$, d and $q_b$, where $\vec{D}_r$ denotes a position vector between the red side and the blue side in a direction from the red side to the blue side; $\vec{D}_b$ denotes a position vector between the blue side and the red side in a direction from the blue side to the red side; $q_r$ denotes a relative azimuth angle of the blue side to the red side; and $q_b$ denotes a relative azimuth angle of the red side to the blue side; and $\vec{D}_r$, $\vec{D}_b$, d, $q_r$ and $q_b$ are calculated as follows:

$$\vec{D}_r = (X_b - X_r, Y_b - Y_r, Z_b - Z_r)$$

$$\vec{D}_b = (X_r - X_b, Y_r - Y_b, Z_r - Z_b)$$

$$d = \sqrt{(X_b - X_r)^2 + (Y_b - Y_r)^2 + (Z_b - Z_r)^2}$$

$$q_r = a\cos\left(\frac{\vec{D}_r \times \vec{V}_r}{\|\vec{D}\|\|\vec{V}_r\|}\right) = a\cos\left(\frac{(X_b - X_r)v_{xr} + (Y_b - Y_r)v_{yr} + (Z_b - Z_r)v_{zr}}{d^* v_r}\right)$$

$$q_b = a\cos\left(\frac{\vec{D}_b \times \vec{V}_b}{\|\vec{D}\|\|\vec{V}_b\|}\right) = a\cos\left(\frac{(X_r - X_b)v_{xb} + (Y_r - Y_b)v_{yb} + (Z_r - Z_b)v_{zb}}{d^* v_b}\right)$$

where $\vec{R}_r = (X_r, Y_r, Z_r)$, $\vec{V}_r = (v_{xr}, v_{yr}, v_{zr})$, $v_r$, $\theta_r$ and $\varphi_r$ are the position vector, velocity vector, velocity, pitch angle and heading angle of the red side, respectively; and $\vec{R}_b = (X_b, Y_b, Z_b)$, $\vec{V}_b = (v_{xb}, v_{yb}, v_{zb})$, $v_b$, $\theta_b$ and $\varphi_b$ are the position vector, velocity vector, velocity, pitch angle and heading angle of the blue side, respectively.

Further, the step S3 may specifically include the following steps:

defining the state space of the red UAV as $S_r = [X_r, Y_r, Z_r, v_r, \theta_r, \varphi_r, d, q_r]$ and the state space of the blue UAV as $S_b = [X_b, Y_b, Z_b, v_b, \theta_b, \varphi_b, d, q_b]$;

defining the action space of the red UAV as $A_r = [dv_r, d\varphi_r, d\theta_r]$ and the action space of the blue UAV as $A_b = [dv_b, d\varphi_b, d\theta_b]$; and forming the reward function R with a distance reward function $R_d$ and an angle reward function $R_q$, $R = w_1 * R_d + w_2 * R_q$, where $w_1, w_2$ denote weights of a distance reward and an angle reward;

the distance reward function $R_d$ is expressed as:

$$R_{d1} = -d/(5 * D_{max})$$

$$R_{d2} = \begin{cases} 3, & \text{if } D_{min} < d < D_{max} \\ -1, & \text{if } d < D_{min} \end{cases}$$

$$R_d = R_{d1} + R_{d2}$$

where $R_{d1}$ denotes a continuous distance reward, while $R_{d2}$ denotes a sparse distance reward; and $D_{min}$ denotes a minimum attack range of a missile carried by the red side, while $D_{max}$ denotes a maximum attack range of the missile carried by the red side; and the angle reward function $R_q$ is expressed as:

$$R_{q1} = -q/180$$

$$R_{q2} = 3, \text{ if } q < q_{max}$$

$$R_q = R_{q1} + R_{q2}$$

where $R_{q1}$ denotes a continuous angle reward, while $R_{q2}$ denotes a sparse angle reward; and $q_{max}$ denotes a maximum off-boresight launch angle of the missile carried by the red side.

Further, the constructing a maneuvering decision-making model structure based on a SAC algorithm may specifically include the following steps:

generating maneuver control quantities for both red and blue sides by the maneuvering decision-making model based on the SAC algorithm using a SAC method, to allow the red and blue sides to maneuver; and implementing the SAC algorithm by neural networks including an replay buffer M, one Actor neural network $\pi_\theta$, two Soft-Q neural networks $Q_{\varphi_1}$ and $Q_{\varphi_2}$, two Target Soft-Q networks $Q_{\varphi'_1}$ and $Q_{\varphi'_2}$, where $\theta$, $\varphi_1$, $\varphi_2$, $\varphi'_1$, $\varphi'_2$ denote weights of the respective networks;

where the Actor neural network $\pi_\theta$ receives an input of a state value $s_t^r$ of the red side or a state value $s_t^b$ of the blue side and generates outputs of mean $\mu(\mu_r, \mu_b)$ and variance $\sigma(\sigma_r, \sigma_b)$; noise $\tau$ is generated by sampling from a standard normal distribution; an action $a_t^r$ of the red side or an action $a_t^b$ of the blue side is generated from the mean $\mu$, variance $\sigma$ and noise $\tau$; the action $a_t^r$ or $a_t^b$ is limited to a range of $(-1,1)$ by using a tanh function, and the process of generating the action is shown below:

$$\mu_r, \sigma_r = \pi_\theta(s_t^r)$$

$$\mu_b, \sigma_b = \pi_\theta(s_t^b)$$

$$a_t^r = N(\mu_r, \sigma_r^2) = \mu_r + \sigma_r * \tau$$

$$a_t^b = N(\mu_b, \sigma_b^2) = \mu_b + \sigma_b * \tau$$

$$a_t^r = \tanh(a_t^r)$$

$$a_t^b = \tanh(a_t^b)$$

the Soft-Q neural networks $Q_{\theta 1}$ and $Q_{\theta 2}$ receive inputs of a state value and an action value and output Q values predicted by the neural networks; the Target Soft-Q neural networks $Q_{\varphi'_1}$ and $Q_{\varphi'_2}$ have a same structure with and are different in network weight from the Soft-Q neural networks; the Soft-Q neural networks are configured to generate predicted Q values and select an action, while the Target Soft-Q neural networks are configured to generate target Q values and evaluate the action; the weights of the Soft-Q neural networks are updated in real time and copied to the Target Soft-Q neural networks after multiple iterations; and each of the Actor, Soft-Q and Target Soft-Q networks is a fully-connected neutral network having l hidden layers, with n neurons in each hidden layer and an activation function ReLU.

Further, the step S5 may specifically include the following steps:

when initializing a plurality of groups of UAVs on both sides, with initial positions within the combat area, and setting an initial velocity range, an initial pitch angle range and an initial heading angle range; and the steps of training the SAC algorithm by performing air combat confrontations to realize parallel self-play are as follows:

step S51: defining the number env_num of parallel self-play environments, defining the number batch_size of batch training sample groups, defining a maximum simulation step size N, initializing step=1, initializing env=1, initializing initial situations of both sides, and obtaining an initial state $s_t^r$ of the red side and an initial state $s_t^b$ of the blue side;

step S52: randomly generating Actor network weight θ, Soft-Q network weights $\varphi_1$, $\varphi_2$ initializing the policy network $\pi_\theta$ and the two Soft-Q networks $Q_{\varphi 1}$, $Q_{\varphi 2}$, supposing $\varphi'_1 = \varphi_1$, $\varphi'_2 = \varphi_2$, and initializing the Target Soft-Q networks $Q_{\varphi'_1}$, $Q_{\varphi'_2}$ with $\varphi'_1, \varphi'_2$ as network weights;

step S53: inputting a state $s_t^r$ of the red side to the Actor network to output a mean $\mu_4$ and a variance $\sigma_r$, obtaining an action $a_t^r$ that fits the action space $A_r$ in step S3 from the process of generating the action in step S4, obtaining a new state by the red side after performing the action $s_{t+1}^r$, and obtaining a reward value $r_t^r$ according to the reward function R in step S3; inputting a state $s_t^b$ of the blue side to the Actor network to output a mean $\mu_b$ and a variance $\sigma_b$, obtaining an action $a_t^b$ that fits the action space $A_b$ in step S3 from the process of generating the action in step S4, obtaining a new state by the blue side after performing the action $s_{t+1}^b$, and obtaining a reward value $r_t^b$ according to the reward function R in step S3; and storing tuple $<s_t^r, a_t^r, s_{t+1}^r, r_t^r>$ and tuple $<s_t^b, a_t^b, s_{t+1}^b, r_t^b>$ in the replay buffer M;

step S54: determining whether env is greater than env_num, and if yes, proceeding to step S55; otherwise, incrementing env by 1, and skipping to step S51;

step S55: when the number of experience groups in the replay buffer is greater than batch_size, randomly sampling batch_size groups of experience to update parameters of the Actor and Soft-Q neutral networks in the SAC algorithm, and updating a regularization coefficient α;

step S56: determining whether step is greater than N, and if yes, proceeding to step S57; otherwise, incrementing step by 1, $s_t^r = s_{t+1}^r$, $s_t^b = s_{t+1}^b$, and skipping to step S53; and step S57: determining whether the algorithm converges or whether training episodes are met, and if yes, ending the training and obtaining the trained SAC algorithm model; otherwise, skipping to step S51.

Further, the step S6 may specifically include the following steps:

step S61: initializing the initial situations of both sides, and obtaining the initial states $s_t^r$, $s_t^b$ of the red and blue sides;

step S62: separately recording the states $s_t^r$, $s_t^b$, inputting the states $s_t^r$, $s_t^b$ to the Actor neutral network of the trained SAC algorithm model to output actions $a_t^r$, $a_t^b$ of the red and blue sides, and obtaining new states $s_{t+1}^r$, $s_{t+1}^b$ after performing the actions by both sides;

step S63: determining whether either of both sides succeeds in engaging in combat, and if yes, ending; otherwise, supposing $s_t^r = s_{t+1}^r$ and $s_t^b = s_{t+1}^b$, and skipping to step S62;

step S64: plotting combat trajectories of both sides according to the recorded states $s_t^r$, $s_t^b$;

step S65: initializing the initial situations of n groups of UAVs on both sides, performing steps S62 to S63 on each group of UAVs on both sides, and finally recording whether either of both sides succeeds in engaging in combat, with the number of times of successfully engaging in combat being denoted as num; and step S66: calculating num/n, namely a final combat success rate, to indicate the generalization capability of the decision-making model.

Further, in the step S5, the initial velocity range may be set as [50 m/s, 400 m/s], and the initial pitch angle range as [−90°,90°] and the initial heading angle range as [−180°, 180°].

The present disclosure has the following beneficial effects:

1. According to the present disclosure, a plurality of battlefield environments are introduced during self-play, and samples and strategies can be shared among the battlefield environments. Thus, maneuvering strategies can be overall optimized.

2. The parallel self-play algorithm proposed in the present disclosure can effectively enhance the level of confrontations and increase the combat success rate of the decision-making model.

DETAILED DESCRIPTION

The present disclosure is further described below in conjunction with the accompanying drawings and embodiments.

Figure 1:
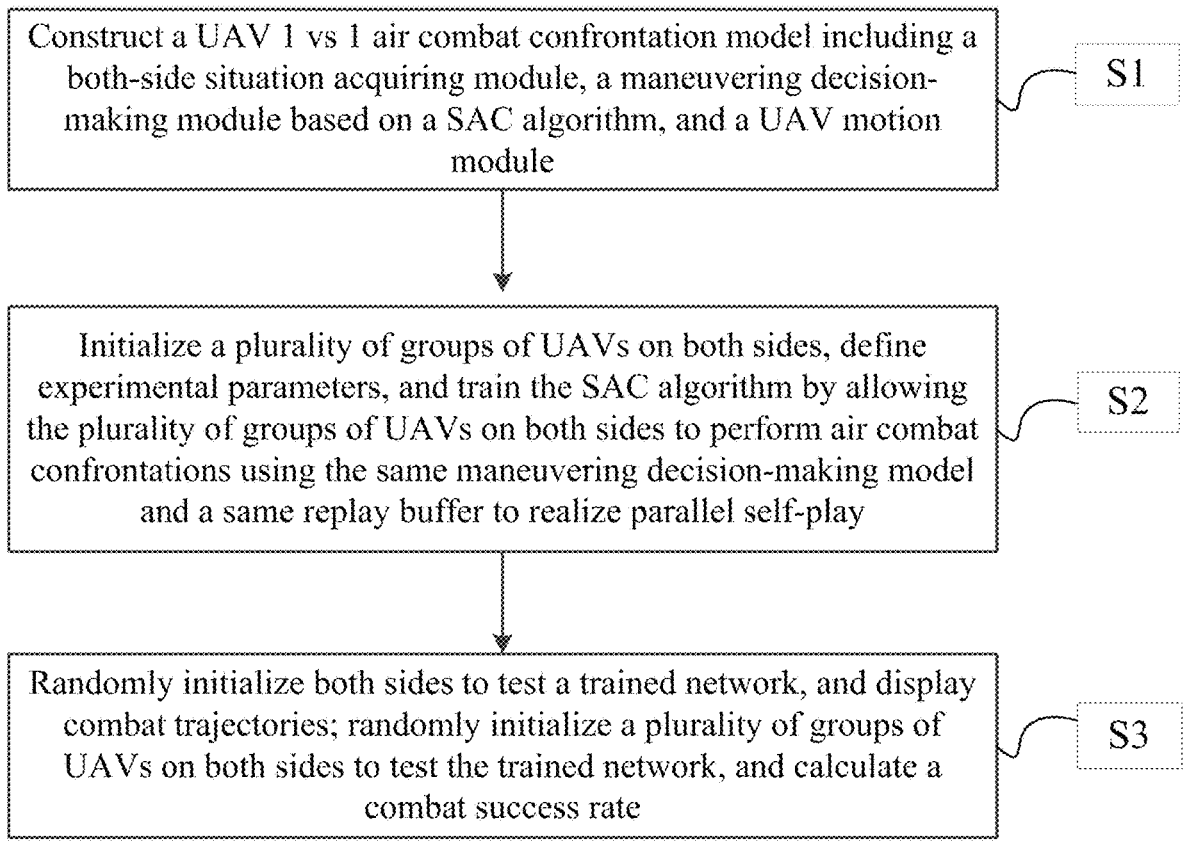
FIG. 1 is a flowchart of a method according to the present disclosure.

As shown in FIG. 1, an air combat maneuvering method based on parallel self-play includes the following steps:

step S1: constructing a UAV maneuver model;

step S2: defining our UAV as red side and enemy UAV as blue side; initializing both red and blue UAVs, and constructing a red-and-blue motion situation acquiring model to describe a relative combat situation of the red and blue sides;

step S3: constructing state spaces $S_r, S_b$ of both red and blue sides, action spaces $A_r, A_b$ of both red and blue sides and a reward function R according to a Markov process;

step S4: constructing a maneuvering decision-making model structure based on a SAC algorithm;

step S5: initializing a plurality of groups of UAVs on both sides, defining experimental parameters, and training the SAC algorithm by allowing the plurality of groups of UAVs on both sides to perform air combat confrontations using the same maneuvering decision-making model and a same replay buffer to realize parallel self-play; and step S6: randomly initializing both sides to test a trained network, and displaying combat trajectories; randomly initializing a plurality of groups of UAVs on both sides to test the trained network, and calculate a combat success rate.

Further, the constructing a UAV maneuver model includes the following specific steps:

The position information of UAVs of both sides is updated according to equations of motion for UAVs, so that maneuvering can be realized. Furthermore, the information of both sides is provided to the both-side situation acquiring model to calculate corresponding situations.

An OXYZ coordinate system is supposed to be a three-dimensional spatial coordinate system for UAVs, where origin O represents the center of a combat area for UAVs, with X axis pointing to the north, Z axis pointing to the east and Y axis pointing in a vertical upward direction.

A UAV is regarded as a mass point and equations of motion for the UAV are established as follows:

$$\begin{cases} X_{t+dT} = X_t + V_{t+dT}*\cos(\theta_{t+dT})*\cos(\varphi_{t+dT})*dT \\ Y_{t+dT} = Y_t + V_{t+dT}*\sin(\theta_{t+dT})*dT \\ Z_{t+dT} = Z_t + V_{t+dT}*\cos(\theta_{t+dT})**\sin(\varphi_{t+dT})dT \end{cases}$$

$$\begin{cases} V_{t+dT} = V_t + dv*dT \\ \theta_{t+dT} = \theta_t + d\theta*dT \\ \varphi_{t+dT} = \varphi_t + d\varphi*dT \end{cases}$$

where t denotes current time; dT denotes an integration step size of the UAV; $[X_t, Y_t, Z_t]$, $[X_{t+dT}, Y_{t+dT}, Z_{t+dT}]$ denote coordinate position components of the UAV at time t and time t+dT, respectively; $V_t$, $V_{t+dT}$ denote velocities of the UAV at time t and time t+dT, respectively; pitch angles $\theta_t$, $\theta_{t+dT}$ are included angles between velocity vectors of the UAV at time t and time t+dT, and XOZ plane; heading angles $\varphi_t$, $\varphi_{t+dT}$ are included angles between projection vectors of the velocity vectors of the UAV at time t and time t+dT on the XOZ plane, and the positive X axis; dv denotes an acceleration of the UAV; d$\theta$ denotes a pitch angle variation of the UAV; and d$\varphi$ denotes a heading angle variation of the UAV;

Further, the step S2 includes the following specific steps:

The red-and-blue motion situation acquiring model can calculate a relative situation according to red and blue state information and provide the relative situation to a maneuvering decision-making module based on a deep reinforcement learning method for decision-making.

The relative situation of both sides acquired by the red-and-blue motion situation acquiring model is described with $\vec{D}$, d and q, where $\vec{D}$ denotes a position vector between the red side and the blue side in a direction from the red side to the blue side; d denotes a distance between the red side and the blue side; q denotes a relative azimuth angle, namely an included angle between the velocity vector $\vec{V}_r$ and the distance vector $\vec{D}$ of the red side.

The combat situation of the blue side relative to the red side is denoted by $\vec{D}_r$, d and $q_r$ and the combat situation of the red side relative to the blue side is denoted by $\vec{D}_b$, d and $q_b$, where $\vec{D}_r$ denotes a position vector between the red side and the blue side in a direction from the red side to the blue side; $\vec{D}_b$ denotes a position vector between the blue side and the red side in a direction from the blue side to the red side; $q_r$ denotes a relative azimuth angle of the blue side to the red side; and $q_b$ denotes a relative azimuth angle of the red side to the blue side.

$\vec{D}_r$, $\vec{D}_b$, d, $q_r$ and $q_b$ are calculated as follows:

$$\vec{D}_r = (X_b - X_r, Y_b - Y_r, Z_b - Z_r)$$

$$\vec{D}_b = (X_r - X_b, Y_r - Y_b, Z_r - Z_b)$$

$$d = \sqrt{(X_b - X_r)^2 + (Y_b - Y_r)^2 + (Z_b - Z_r)^2}$$

$$q_r = a\cos\left(\frac{\vec{D}_r \times \vec{V}_r}{\|\vec{D}\|\|\vec{V}_r\|}\right) = a\cos\left(\frac{(X_b - X_r)v_{xr} + (Y_b - Y_r)v_{yr} + (Z_b - Z_r)v_{zr}}{d*v_r}\right)$$

$$q_b = a\cos\left(\frac{\vec{D}_b \times \vec{V}_b}{\|\vec{D}\|\|\vec{V}_b\|}\right) = a\cos\left(\frac{(X_r - X_b)v_{xb} + (Y_r - Y_b)v_{yb} + (Z_r - Z_b)v_{zb}}{d*v_b}\right)$$

where $\vec{R}_r=(X_r, Y_r, Z_r)$, $\vec{V}_r=(v_{xr}, v_{yr}, v_{zr})$, $v_r$, $\theta_r$ and $\varphi_r$ are the position vector, velocity vector, velocity, pitch angle and heading angle of the red side, respectively; and $\vec{R}_b=(X_b, Y_b, Z_b)$, $\vec{V}_b=(v_{xb}, v_{yb}, v_{zb})$, $v_b$, $\theta_b$ and $\varphi_b$ are the position vector, velocity vector, velocity, pitch angle and heading angle of the blue side, respectively.

Further, the step S3 includes the following specific steps:

The state space of the red UAV is defined as $S_r=[X_r, Y_r, Z_r, v_r, \theta_r, \varphi_r, d, q_r]$ and the state space of the blue UAV is defined as $S_b=[X_b, Y_b, Z_b, v_b, \theta_b, \varphi_b, d, q_b]$.

The action space of the red UAV is defined as $A_r=[dv_r, d\varphi_r, d\theta_r]$ and the action space of the blue UAV is defined as $A_b=[dv_b, d\varphi_b, d\theta_b]$.

The reward function R is formed with a distance reward function $R_d$ and an angle reward function $R_q$, $R=w_1*R_d+w_2*R_q$, where $w_1,w_2$ denote weights of a distance reward and an angle reward.

The distance reward function $R_d$ is expressed as:

$$R_{d1} = -d/(5*D_{max})$$

$$R_{d2} = \begin{cases} 3, & \text{if } D_{min} < d < D_{max} \\ -1, & \text{if } d < D_{min} \end{cases}$$

$$R_d = R_{d1} + R_{d2}$$

where $R_{d1}$ denotes a continuous distance reward, while $R_{d2}$ denotes a sparse distance reward; and $D_{min}$ denotes a minimum attack range of a missile carried by the red side, while $D_{max}$ denotes a maximum attack range of the missile carried by the red side.

The angle reward function $R_q$ is expressed as:

$$R_{q1}=-q/180$$

$$R_{q2}=3, \text{ if } q<q_{max}$$

$$R_q=R_{q1}+R_{q2}$$

where $R_{q1}$ denotes a continuous angle reward, while $R_{q2}$ denotes a sparse angle reward; and $q_{max}$ denotes a maximum off-boresight launch angle of the missile carried by the red side.

Figure 2:
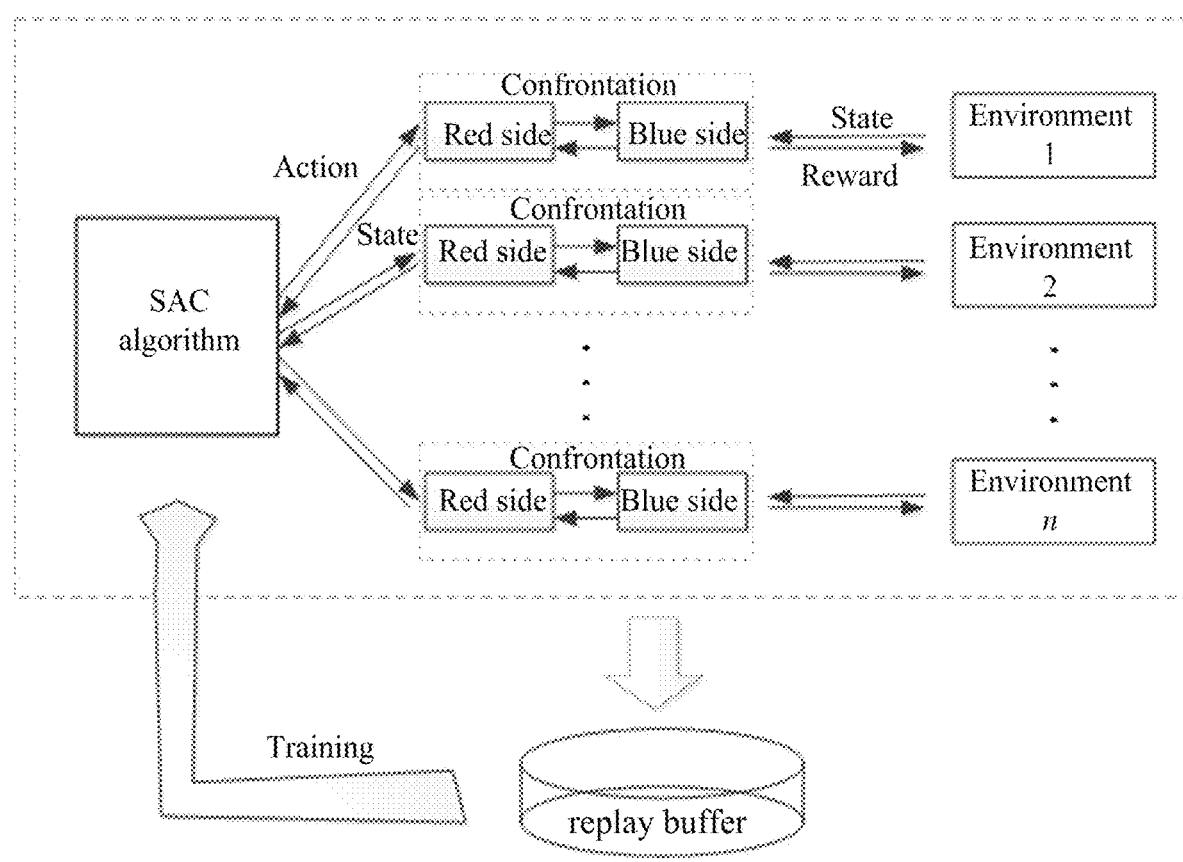
FIG. 2 is a schematic diagram of self-play in a method according to the present disclosure.

Further, as shown in FIG. 2, the constructing a maneuvering decision-making model structure based on a SAC algorithm includes the following specific steps:

Maneuver control quantities for both red and blue sides are generated by the maneuvering decision-making model based on the SAC algorithm using a SAC method, to allow the red and blue sides to maneuver.

The SAC algorithm is implemented by neural networks including an replay buffer M, one Actor neural network $\pi_\theta$, two Soft-Q neural networks $Q_{\varphi 1}$ and $Q_{\varphi 2}$, two Target Soft-Q networks $Q_{\varphi'_1}$ and $Q_{\varphi'_2}$, where $\theta$, $\varphi_1$, $\varphi_2$, $\varphi'_1$, $\varphi'_2$ denote weights of the respective networks.

The replay buffer M is an experience replay buffer structure for specially storing experience learned in reinforcement learning.

The Actor neural network $\pi_\theta$ receives an input of a state value $s_t^r$ of the red side or a state value $s_t^b$ of the blue side and generates outputs of mean $\mu(\mu_r,\mu_b)$ and variance $\sigma(\sigma_r, \sigma_b)$. Noise $\tau$ is generated by sampling from a standard normal distribution. An action $a_t^r$ of the red side or an action $a_t^b$ of the blue side is generated from the mean $\mu$, variance $\sigma$ and noise $\tau$. The action $a_t^r$ or $a_t^b$ is limited to a range of (−1,1) by using a tanh function, and the process of generating the action is shown below:

$$\mu_r,\sigma_r=\pi_\theta(s_t^r)$$

$$\mu_b,\sigma_b=\pi_\theta(s_t^b)$$

$$a_t^r=N(\mu_r,\sigma_r^2)=\mu_r+\sigma_r*\tau$$

$$a_t^b=N(\mu_b,\sigma_b^2)=\mu_b+\sigma_b*\tau$$

$$a_t^r=\tanh(a_t^r)$$

$$a_t^b=\tanh(a_t^b)$$

The Soft-Q neural networks $Q_{\varphi 1}$ and $Q_{\varphi 2}$ receive inputs of a state value and an action value and output Q values predicted by the neural networks. The Target Soft-Q neural networks $Q_{\varphi'_1}$ and $Q_{\varphi'_2}$ have a same structure with and are different in network weight from the Soft-Q neural networks. The Soft-Q neural networks are configured to generate predicted Q values and select an action, while the Target Soft-Q neural networks are configured to generate target Q values and evaluate the action. The weights of the Soft-Q neural networks are updated in real time and copied to the Target Soft-Q neural networks after multiple iterations.

Each of the Actor, Soft-Q and Target Soft-Q networks is a fully-connected neutral network having l hidden layers, with n neurons in each hidden layer and an activation function ReLU.

Further, the step S5 includes the following specific steps:

When initializing a plurality of groups of UAVs on both sides, with initial positions within the combat area, an initial velocity range is set as [50 m/s, 400 m/s], and an initial pitch angle range as [−90°,90°] and an initial heading angle range as [−180°,180°].

The steps of training the SAC algorithm by performing air combat confrontations to realize parallel self-play are as follows:

step S51: defining the number env_num of parallel self-play environments, defining the number batch_size of batch training sample groups, defining a maximum simulation step size N, initialize step=1, initialize env=1, initializing initial situations of both sides, and obtaining an initial state $s_t^r$ of the red side and an initial state $s_t^b$ of the blue side;

step S52: randomly generating Actor network weight $\theta$, and Soft-Q network weights $\varphi_1$, $\varphi_2$, initializing the policy network $\pi_\theta$ and the two Soft-Q networks $Q_{\varphi 1}$, $Q_{\varphi 2}$, letting $\varphi'_1=\varphi_q$, $\varphi'_2=\varphi_2$, and initializing the Target Soft-Q networks $Q_{\varphi'_1}$, $Q_{\varphi'_2}$ with $\varphi'_1,\varphi'_2$ as network weights.

step S53: inputting a state $s_t^r$ of the red side to the Actor network to output a mean $\mu_r$ and a variance $\sigma_r$, obtaining an action $a_t^r$ that fits the action space $A_r$ in step S3 from the process of generating the action in step S4, obtaining a new state $s_{t+1}^r$ by the red side after performing the action, and obtaining a reward value $r_t^r$ according to the reward function R in step S3; inputting a state $s_t^b$ of the blue side to the Actor network to output a mean $\mu_b$ and a variance $\sigma_b$, obtaining an action $a_t^b$ that fits the action space $A_b$ in step S3 from the process of generating the action in step S4, obtaining a new state $s_{t+1}^b$ by the blue side after performing the action, and obtaining a reward value $r_t^b$ according to the reward function R in step S3; and storing tuple $<s_t^r, a_t^r, s_{t+1}^r, r_t^r>$ and tuple $<s_t^b, a_t^b, s_{t+1}^b, r_t^b>$ in the replay buffer M;

step S54: determining whether env is greater than env_num, and if yes, proceeding to step S55; otherwise, incrementing env by 1, and skipping to step S51;

step S55: when the number of experience groups in the replay buffer M is greater than batch_size, randomly sampling batch_size groups of experience to update the parameters of the Actor and Soft-Q neutral networks in the SAC algorithm, and update a regularization coefficient $\alpha$, where each group of data is redefined as $<s_t, a_t, s_{t+1}, r>$. Gradient descent is performed on the loss function of the Actor neutral network and the loss function $J_q(\varphi_i)$ i=1, 2 of the Soft-Q neutral networks with a learning rate lr to update the weights of the Actor neutral network and the Soft-Q neutral networks.

Both Soft-Q functions are defined as minimum output values of the Target Soft-Q networks $Q_{\varphi'_1}$, $Q_{\varphi'_2}$, and therefore, the following formula is given:

$$Q_{\varphi'}(s_t,a_t)=\min(Q_{\varphi 1'}(s_t,a_t),Q_{\varphi 2'}(s_t,a_t))$$

where $Q_{\varphi 1'}(s_t,a_t), Q_{\varphi 2'}(s_t,a_t)$ denote output target Q values of the Target Soft-Q networks $Q_{\varphi'_1}$, $Q_{\varphi'_2}$, respectively.

The loss function of the Actor neutral network is defined as follows:

$$J_\pi(\theta)=E_{s_t\sim M,a_t\sim\pi_\theta}[\log \pi_\theta(a_t|s_t)-Q_{\varphi'}(s_t,a_t)]$$

The loss function $J_Q(\varphi_i)$ i=1, 2 of the Soft-Q neutral networks is defined as follows:

$$J_Q(\varphi_i) = E_{(s_t,a_t,s_{t+1})\sim M, a_{t+1}\sim\pi_\theta}\left[\frac{1}{2}Q_{\varphi_i}(s_t, a_t) - \right.$$
$$\left.(r(s_t, a_t) + \gamma(Q_{\varphi'}(s_{t+1}, a_{t+1}) - \alpha\log\pi_\theta(a_{t+1} | s_{t+1})))^2\right]$$

The weights $\varphi'_1,\varphi'_2$ of the Target Soft-Q neutral networks are updated as follows:

$$\varphi'_1\leftarrow\varphi+(1-\tau)\varphi'_1$$

$$\varphi'_2\leftarrow\varphi+(1-\tau)\varphi'_2$$

A regularization coefficient $\alpha$ is updated, and its loss function is as follows:

$$J(\alpha)=E[-\alpha \log \pi_t(a_t|s_t)-\alpha H_0]$$

step S56: determining whether step is greater than N, and if yes, proceeding to step S57; otherwise, incrementing step by 1, $s_t^r=s_{t+1}^r$, $s_t^b=s_{t+1}^b$, and skipping to step S53; and step S57: determining whether the algorithm converges or whether training episodes are met, and if yes, ending the training and obtaining the trained SAC algorithm model; otherwise, skipping to step S51.

Further, the step S6 includes the following specific steps:

step S61: initializing the initial situations of both sides, and obtaining the initial states $s_t^r$, $s_t^b$ of the red and blue sides;

step S62: separately recording the states $s_t^r$, $s_t^b$, inputting the states $s_t^r$, $s_t^b$ to the Actor neutral network of the trained SAC algorithm model to output actions $a_t^r$, $a_t^b$ of the red and blue sides, and obtaining new states $s_{t+1}^r$, $s_{t+1}^b$ after performing the actions by both sides;

step S63: determining whether either of both sides succeeds in engaging in combat, and if yes, ending; otherwise, letting $s_t'^r = s_{t+1}^r$ and $s_t'^b = s_{t+1}^b$, and skipping to step S62;

step S64: plotting combat trajectories of both sides according to the recorded states $s_t^r$, $s_t^b$;

step S65: initializing the initial situations of n groups of UAVs on both sides, performing steps S62 to S63 on each group of UAVs on both sides, and finally recording whether either of both sides succeeds in engaging in combat, with the number of times of successfully engaging in combat being denoted as num; and step S66: calculating num/n, namely a final combat success rate, to indicate the generalization capability of the decision-making model.

Specific Exemplary Embodiments

In the embodiment, when initializing a plurality of groups of UAVs on both sides, the combat area is $x \in [-6\text{ km}, 6\text{ km}]$, $y \in [3\text{ km}, 4\text{ km}]$, $z \in [-6\text{ km}, 6\text{ km}]$, and an initial velocity range is [50 m/s, 400 m/s], while an initial pitch angle range is [−90°, 90°] and an initial heading angle range is [−180°, 180°].

The maximum attack range of a missile is 6 km and a minimum attack range is 1 km. The maximum off-boresight launch angle of the missile is 30°, $w_1 = w_2 = 0.5$.

The SAC algorithm model is constructed as follows: in the Actor neutral network in the SAC algorithm, the number of hidden layers l=2, and in each layer, the number of nodes n=256. The optimization algorithm is Adam algorithm, with discount factor $\gamma = 0.99$, network learning rate lr=0.0003, entropy regularization coefficient $\alpha = 1$ and target entropy value $H_0 = -3$.

The number of parallel self-play environments is defined as env_num=[2, 4, 6, 8, 10, 12, 14, 16, 18, 20]; the number of training sample groups is defined as batch_size=128; and the maximum simulation step size is defined as N=800.

Figure 3:
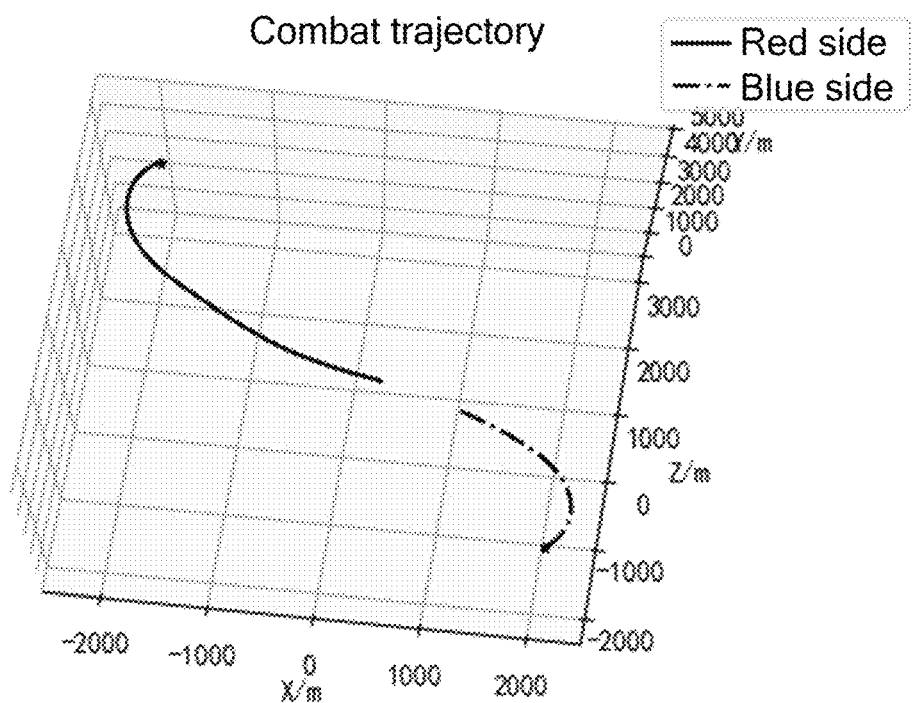
FIG. 3 is a chart of combat trajectories according to an embodiment of the present disclosure.

After the training is finished, both sides are randomly initialized to test the trained algorithm, and combat trajectories are displayed, as shown in FIG. 3. As shown, after the combat is started, both red and blue sides make decisions using the trained model simultaneously and can effectively approach each other and attack the opponents.

Figure 4:
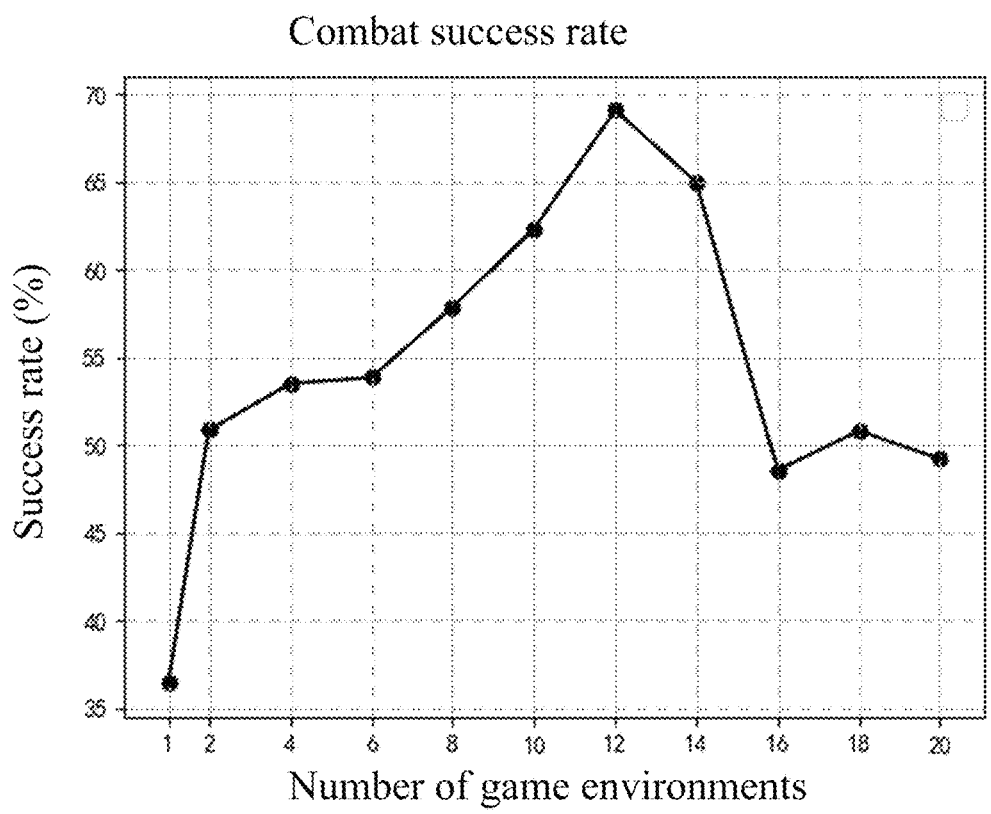
FIG. 4 is a combat success rate curve according to an embodiment of the present disclosure.

200 Groups of UAVs on both sides are randomly initialized to test the trained algorithm, and a combat success rate is calculated. The results of the combat success rate varying with the number of parallel self-play environments is calculated as shown in FIG. 4. As shown, during training by parallel self-play, since the algorithm is characterized by sample sharing and strategy sharing, the model can comprehensively learn decisions suitable for all combat environments with increasing game environments, avoid overfitting, improve the generalization capability, allowing for optimal overall combat, and thus can reach a higher combat success rate in a new environment. When the number of the parallel game environments is 12, the decision model has the highest generalization capability and can achieve 69.15% combat success rate. With further increasing game environments, samples generated by the environments are too complicated, and the algorithm cannot allow agents in all environments to realize optimal combat and thereby will lose part of decision-making capability, leading to gradually reduced combat success rate.

Therefore, the maneuvering decision-making of UAVs can be effectively realized, and the generalization capability of the model can be improved, so that the model can be more practicable.

What is claimed is:

1. An air combat maneuvering method based on parallel self-play, comprising:

step S1: constructing a unmanned aerial vehicle (UAV) maneuver model, comprising the following steps:

supposing an OXYZ coordinate system to be a three-dimensional spatial coordinate system for UAVs, where origin O represents the center of a combat area for UAVs, with X axis pointing to the north, Z axis pointing to the east and Y axis pointing in a vertical upward direction;

regarding a UAV as a mass point and establishing equations of motion for the UAV as follows:

$$\begin{cases} X_{t+dT} = X_t + V_{t+dT} * \cos(\theta_{t+dT}) * \cos(\varphi_{t+dT}) * dT \\ Y_{t+dT} = Y_t + V_{t+dT} * \sin(\theta_{t+dT}) * dT \\ Z_{t+dT} = Z_t + V_{t+dT} * \cos(\theta_{t+dT}) * * \sin(\varphi_{t+dT}) dT \end{cases}$$

$$\begin{cases} V_{t+dT} = V_t + dv * dT \\ \theta_{t+dT} = \theta_t + d\theta * dT \\ \varphi_{t+dT} = \varphi_t + d\varphi * dT \end{cases}$$

wherein t denotes current time; dT denotes an integration step size of the UAV; $[X_t, Y_t, Z_t]$, $[X_{t+dT}, Y_{t+dT}, Z_{t+dT}]$ denote coordinate position components of the UAV at time t and time t+dT, respectively; $V_t$, $V_{t+dT}$ denote velocities of the UAV at time t and time t+dT, respectively; pitch angles $\theta_t, \theta_{t+dT}$ are included angles between velocity vectors of the UAV at time t and time t+dT, and XOZ plane; heading angles $\varphi_t, \varphi_{t+dT}$ are included angles between projection vectors of the velocity vectors of the UAV at time t and time t+dT on the XOZ plane, and the positive X axis; dv denotes an acceleration of the UAV; d$\theta$ denotes a pitch angle variation of the UAV; and d$\varphi$ denotes a heading angle variation of the UAV;

step S2: defining our UAV as red side and enemy UAV as blue side; initializing both red and blue UAVs, and constructing a red-and-blue motion situation acquiring model to describe a relative combat situation of the red and blue sides;

step S3: constructing state spaces $S_r, S_b$ of both red and blue sides, action spaces $A_r, A_b$ of both red and blue sides and a reward function R according to a Markov process;

step S4: constructing a maneuvering decision-making model structure based on a soft actor-critic (SAC) algorithm;

step S5: initializing a plurality of groups of UAVs on both sides, defining experimental parameters, and training the SAC algorithm by allowing the plurality of groups of UAVs on both sides to perform air combat confrontations using the same maneuvering decision-making model and a same replay buffer to realize parallel self-play; and step S6: randomly initializing both sides to test a trained network, and displaying combat trajectories; randomly initializing the plurality of groups of UAVs on both sides to test the trained network, and calculating a combat success rate.

2. The air combat maneuvering method based on parallel self-play according to claim 1, wherein the step S2 comprises:

describing the relative situation of both sides acquired by the red-and-blue motion situation acquiring model with $\vec{D}$, d and q, wherein $\vec{D}$ denotes a position vector between the red side and the blue side in a direction from the red side to the blue side; d denotes a distance between the red side and the blue side; q denotes a relative azimuth angle, namely an included angle between the velocity vector $\vec{V}_r$ and the distance vector $\vec{D}$ of the red side; and denoting the combat situation of the blue side relative to the red side by $\vec{D}_r$, d and $q_r$, and the combat situation of the red side relative to the blue side by $\vec{D}_b$, d and $q_b$, wherein $\vec{D}_r$ denotes a position vector between the red side and the blue side in a direction from the red side to the blue side; $\vec{D}_b$ denotes a position vector between the blue side and the red side in a direction from the blue side to the red side; $q_r$ denotes a relative azimuth angle of the blue side to the red side; and $q_b$ denotes a relative azimuth angle of the red side to the blue side; and $\vec{D}_r$, $\vec{D}_b$, d, $q_r$ and $q_b$ are calculated as follows:

$$\vec{D}_r = (X_b - X_r, Y_b - Y_r, Z_b - Z_r)$$

$$\vec{D}_b = (X_r - X_b, Y_r - Y_b, Z_r - Z_b)$$

$$d = \sqrt{(X_b - X_r)^2 + (Y_b - Y_r)^2 + (Z_b - Z_r)^2}$$

$$q_r = a\cos\left(\frac{\vec{D}_r \times \vec{V}_r}{\|\vec{D}\|\|\vec{V}_r\|}\right) = a\cos\left(\frac{(X_b - X_r)v_{xr} + (Y_b - Y_r)v_{yr} + (Z_b - Z_r)v_{zr}}{d^* v_r}\right)$$

$$q_b = a\cos\left(\frac{\vec{D}_b \times \vec{V}_b}{\|\vec{D}\|\|\vec{V}_b\|}\right) = a\cos\left(\frac{(X_r - X_b)v_{xb} + (Y_r - Y_b)v_{yb} + (Z_r - Z_b)v_{zb}}{d^* v_b}\right)$$

wherein $\vec{R}_r=(X_r, Y_r, Z_r)$, $\vec{V}_r=(v_{xr}, v_{yr}, v_{zr})$, $v_r$, $\theta_r$ and $\varphi_r$ are the position vector, velocity vector, velocity, pitch angle and heading angle of the red side, respectively; and $\vec{R}_b=(X_b, Y_b, Z_b)$, $\vec{V}_b=(v_{xb}, v_{yb}, v_{zb})$, $v_b$, $\theta_b$ and $\varphi_b$ are the position vector, velocity vector, velocity, pitch angle and heading angle of the blue side, respectively.

3. The air combat maneuvering method based on parallel self-play according to claim 2, wherein the step S3 comprises:

defining the state space of the red UAV as $S_r=[X_r, Y_r, Z_r, v_r, \theta_r, \varphi_r, d, q_r]$ and the state space of the blue UAV as $S_b=[X_b, Y_b, Z_b, v_b, \theta_b, \varphi_b, d, q_b]$;

defining the action space of the red UAV as $A_r=[dv_r, d\varphi_r, d\theta_r]$ and the action space of the blue UAV as $A_b=[dv_b, d\varphi_b, d\theta_b]$; and forming the reward function R with a distance reward function $R_d$ and an angle reward function $R_q$, $R=w_1*R_d+w_2*R_q$, wherein $w_1$, $w_2$ denote weights of a distance reward and an angle reward;

the distance reward function $R_d$ is expressed as:

$$R_{d1} = -d/(5*D_{max})$$

$$R_{d2} = \begin{cases} 3, & \text{if } D_{min} < d < D_{max} \\ -1, & \text{if } d < D_{min} \end{cases}$$

$$R_d = R_{d1} + R_{d2}$$

wherein $R_{d1}$ denotes a continuous distance reward while $R_{d2}$ denotes a sparse distance reward; and $D_{min}$ denotes a minimum attack range of a missile carried by the red side, while $D_{max}$ denotes a maximum attack range of the missile carried by the red side; and the angle reward function $R_q$ is expressed as:

$$R_{q1} = -q/180$$

$$R_{q2} = 3, \text{ if } q < q_{max}$$

$$R_q = R_{q1} + R_{q2}$$

wherein $R_{q1}$ denotes a continuous angle reward, while $R_{q2}$ denotes a sparse angle reward; and $q_{max}$ denotes a maximum off-boresight launch angle of the missile carried by the red side.

4. The air combat maneuvering method based on parallel self-play according to claim 3, wherein the constructing a maneuvering decision-making model structure based on a SAC algorithm comprises:

generating maneuver control quantities for both red and blue sides by the maneuvering decision-making model based on the SAC algorithm using a SAC method, to allow the red and blue sides to maneuver; and implementing the SAC algorithm by neural networks including an replay buffer M, one Actor neural network $\pi_\theta$, two Soft-Q neural networks $Q_{\varphi_1}$ and $Q_{\varphi_2}$, two Target Soft-Q networks $Q_{\varphi'_1}$ and $Q_{\varphi'_2}$, wherein $\theta$, $\varphi_1$, $\varphi_2$, $\varphi'_1$, $\varphi'_2$ denote weights of the respective networks;

wherein the Actor neural network $\pi_\theta$ receives an input of a state value $s_t^r$ of the red side or a state value $s_t^b$ of the blue side and generates outputs of mean $\mu(\mu_r, \mu_b)$ and variance $\sigma(\sigma_r, \sigma_b)$; noise $\tau$ is generated by sampling from a standard normal distribution; an action $a_t^r$ of the red side or an action $a_t^b$ of the blue side is generated from the mean $\mu$, variance $\sigma$ and noise $\tau$; the action $a_t^r$ or $a_t^b$ is limited to a range of $(-1,1)$ by using a tanh function, and the process of generating the action is shown below:

$$\mu_r, \sigma_r = \pi_\theta(s_t^r)$$

$$\mu_b, \sigma_b = \pi_\theta(s_t^b)$$

$$a_t^r = N(\mu_r, \sigma_r^2) = \mu_r + \sigma_r * \tau$$

$$a_t^b = N(\mu_b, \sigma_b^2) = \mu_b + \sigma_b * \tau$$

$$a_t^r = \tanh(a_t^r)$$

$$a_t^b = \tanh(a_t^b)$$

the Soft-Q neural networks $Q_{\theta 1}$ and $Q_{\theta 2}$ receive inputs of a state value and an action value and output Q values predicted by the neural networks; the Target Soft-Q neural networks $Q_{\varphi'_1}$ and $Q_{\varphi'_2}$ have a same structure with and are different in network weight from the Soft-Q neural networks; the Soft-Q neural networks are configured to generate predicted Q values and select an action, while the Target Soft-Q neural networks are configured to generate target Q values and evaluate the action; the weights of the Soft-Q neural networks are updated in real time, and copied to the Target Soft-Q neural networks after multiple iterations; and each of the Actor, Soft-Q and Target Soft-Q networks is a fully-connected neutral network having 1 hidden layers, with n neurons in each hidden layer and an activation function ReLU.

5. The air combat maneuvering method based on parallel self-play according to claim 4, wherein the step S5 comprises:

when initializing a plurality of groups of UAVs on both sides, with initial positions within the combat area, and setting an initial velocity range, an initial pitch angle range and an initial heading angle range; and the steps of training the SAC algorithm by performing air combat confrontations to realize parallel self-play are as follows:

step S51: defining the number env_num of parallel self-play environments, defining the number batch_size of batch training sample groups, defining a maximum simulation step size N, initializing step=1, initializing env=1, initializing initial situations of both sides, and obtaining an initial state $s_t^r$ of the red side and an initial state $s_t^b$ of the blue side;

step S52: randomly generating Actor network weight θ, Soft-Q network weights $\varphi_1$, $\varphi_2$, initializing the policy network $\pi_\theta$ and the two Soft-Q networks $Q_{\varphi1}$, $Q_{\varphi2}$, supposing $\varphi'_1=\varphi_1$, $\varphi'_2=\varphi_2$, and initializing the Target Soft-Q networks $Q_{\varphi'_1}$, $Q_{\varphi'_2}$ with $\varphi'_1, \varphi'_2$ as network weights;

step S53: inputting a state $s_t^r$ of the red side to the Actor network to output a mean $\mu_4$ and a variance $\sigma_r$, obtaining an action $a_t^r$ that fits the action space $A_r$ in step S3 from the process of generating the action in step S4, obtaining a new state by the red side after performing the action $s_{t+1}^r$, and obtaining a reward value $r_t^r$ according to the reward function R in step S3; inputting a state $s_t^b$ of the blue side to the Actor network to output a mean $\mu_b$ and a variance $\sigma_b$, obtaining an action $a_t^b$ that fits the action space $A_b$ in step S3 from the process of generating the action in step S4, obtaining a new state by the blue side after performing the action $s_{t+1}^b$, and obtaining a reward value $r_t^b$ according to the reward function R in step S3; and storing tuple $<s_t^r, a_t^r, s_{t+1}^r, r_t^r>$ and tuple $<s_t^b, a_t^b, s_{t+1}^b, r_t^b>$ in the replay buffer M;

step S54: determining whether env is greater than env_num, and if yes, proceeding to step S55; otherwise, incrementing env by 1, and skipping to step S51;

step S55: when the number of experience groups in the replay buffer is greater than batch_size, randomly sampling batch_size groups of experience to update parameters of the Actor and Soft-Q neutral networks in the SAC algorithm, and updating a regularization coefficient α;

step S56: determining whether step is greater than N, and if yes, proceeding to step S57; otherwise, incrementing step by 1, $s_t^r=s_{t+1}^r$, $s_t^b=s_{t+1}^b$, and skipping to step S53; and step S57: determining whether the algorithm converges or whether training episodes are met, and if yes, ending the training and obtaining the trained SAC algorithm model; otherwise, skipping to step S51.

6. The air combat maneuvering method based on parallel self-play according to claim 5, wherein the step S6 comprises:

step S61: initializing the initial situations of both sides, and obtaining the initial states $s_t^r$, $s_t^b$ of the red and blue sides;

step S62: separately recording the states $s_t^r$, $s_t^b$, inputting the states $s_t^r$, $s_t^b$ to the Actor neutral network of the trained SAC algorithm model to output actions $a_t^r$, $a_t^b$ of the red and blue sides, and obtaining new states $s_{t+1}^r$, $s_{t+1}^b$ after performing the actions by both sides;

step S63: determining whether either of both sides succeeds in engaging in combat, and if yes, ending; otherwise, supposing $s_t^r=s_{t+1}^r$ and $s_t^b=s_{t+1}^b$, and skipping to step S62;

step S64: plotting combat trajectories of both sides according to the recorded states $s_t^r$, $s_t^b$;

step S65: initializing the initial situations of n groups of UAVs on both sides, performing steps S62 to S63 on each group of UAVs on both sides, and finally recording whether either of both sides succeeds in engaging in combat, with the number of times of successfully engaging in combat being denoted as num; and step S66: calculating num/n, namely a final combat success rate, to indicate the generalization capability of the decision-making model.

7. The air combat maneuvering method based on parallel self-play according to claim 6, wherein in the step S5, the initial velocity range is set as [50 m/s, 400 m/s], the initial pitch angle range as [−90°,90°] and the initial heading angle range as [−180°,180°].

* * * * *